(12) United States Patent
Sorie

(10) Patent No.: US 6,386,457 B1
(45) Date of Patent: May 14, 2002

(54) PREPAID ENTERTAINMENT CARD AND METHODS AND SYSTEMS FOR USING PREPAID ENTERTAINMENT CARD

(76) Inventor: Edward Earl Sorie, 113 S. Windmere, Rocky Mount, NC (US) 27803

(*) Notice: Subject to any disclaimer, the term of this patent is extended or adjusted under 35 U.S.C. 154(b) by 0 days.

(21) Appl. No.: 09/552,052

(22) Filed: Apr. 19, 2000

(51) Int. Cl.[7] .............................................. G06K 19/00
(52) U.S. Cl. ........................ 235/487; 235/493; 902/27
(58) Field of Search ................................. 235/487, 492, 235/493, 494, 462.01; 902/26, 27

(56) References Cited

U.S. PATENT DOCUMENTS

| | | | | |
|---|---|---|---|---|
| 4,325,078 A | * | 4/1982 | Seaton et al. ................ | 358/117 |
| 4,358,672 A | * | 11/1982 | Hyatt et al. .................. | 235/380 |
| 5,561,709 A | * | 10/1996 | Remillard ..................... | 379/96 |
| 5,577,109 A | * | 11/1996 | Stimson et al. .............. | 235/381 |
| 5,767,896 A | * | 6/1998 | Nemirofsky .................. | 348/13 |
| 5,852,290 A | * | 12/1998 | Chaney ........................ | 235/492 |
| 6,018,775 A | * | 1/2000 | Vossler .......................... | 710/1 |
| 6,167,387 A | | 12/2000 | Lee-Wai-Yin | |

FOREIGN PATENT DOCUMENTS

| | | | | |
|---|---|---|---|---|
| WO | 9921361 | * | 10/1997 | ............ H04N/7/16 |

OTHER PUBLICATIONS

Hofland et al., "Smarter Smartcards," http://www.byte.com/art/9802/sec17/art1.htm, Internet Tech Web Page, 7 pages, (Feb. 1998).

David Thompson, "The Lessons of Divx," http://www.zdnet.com/pcweek/stories/columns/0,4351,410083,00.html, Internet PCWeek Online, 3 pages, (Jul. 26, 1999).

Dan Amdur, "European Banks Play Their (Smart) Cards," http://www.byte.com/art/9704/sec18/art.1htm, Internet TechWeb Page, 7 pages, (Apr. 1997).

* cited by examiner

*Primary Examiner*—Michael G. Lee
*Assistant Examiner*—Daniel St.Cyr
(74) *Attorney, Agent, or Firm*—Jenkins & Wilson, P.A.

(57) ABSTRACT

A prepaid entertainment card includes a card body. The card body includes first, second, and third codes. The first code encodes a card type, the second code encodes a monetary amount to be applied to paid television programming and the third code encodes a card identification. Such a card may be used by television programming providers to collect revenue for providing television programming to subscribers in advance of providing at least some of the programming to the subscribers.

29 Claims, 8 Drawing Sheets

PREPAID ENTERTAINMENT CARD AND METHODS AND SYSTEMS FOR USING PREPAID ENTERTAINMENT CARD

TECHNICAL FIELD

The present invention relates generally to prepaid entertainment cards. More particularly, the present invention relates to prepaid entertainment cards that allow subscribers to pay for television programming in advance and that allow television programming providers to collect revenue for television programming in advance.

BACKGROUND ART

Television programming providers, such as satellite television providers and cable television providers, provide television programming to subscribers in return for payment. For example, cable television providers commonly charge a monthly fee to provide subscriber access to predetermined channels. Similarly, satellite television providers charge a monthly fee for subscriber access to predetermined channels.

In addition to the monthly fee associated with providing access to predetermined channels, both cable and satellite television providers charge additional fees for providing specific programming to a subscriber. For example, in cable television systems, pay-per-view movies are offered during predetermined time periods. In order to receive a pay-per-view movie, a subscriber must call the cable television provider and request access to the movie. The cable television provider allows the subscriber to access the movie and adds a charge to the subscriber's account for the movie. A similar process occurs for a subscriber to order a sporting event. Satellite television systems are similar to cable television systems in that subscribers are provided access to selected movies and other programming before actually having to pay for the movies or programming.

When television programming providers allow subscribers to view movies, sporting events, or other special events before being charged for the events, the television programming provider is effectively extending credit to the subscriber. The amount of credit extended to subscribers can become substantially high when a number of subscribers are extended credit for the same movie or event. In addition, a television programming provider is charged for providing access to special events, such as sporting events. This charge can often be a flat fee for the sporting event. Thus, the television programming provider has an incentive to allow as many subscribers as possible to view these sporting events even if the subscriber's account is not current. Television programming providers may have an even greater incentive to provide subscriber access to a special event even when the subscriber has an account that is not current on the day the event occurs.

For example, a television programming provider may pay a flat fee to a boxing organization to provide subscriber access to a boxing match. On the day of the boxing match, the television programming provider may extend credit to subscribers who would normally not be permitted to view the boxing match because the opportunity for gaining revenue for the boxing match ends after the boxing match occurs. Because the television programming provider is charged a fixed fee for the boxing match, there is little incentive to limit subscriber access to the match.

Extending credit to subscribers who are not capable of or are unwilling to keep their accounts current provides a number of problems for television programming providers. For example, television programming providers have employees dedicated to collecting revenue on non-current accounts. The workload of these employees is greatly increased when a television programming provider extends credit to customers who have a history of maintaining a non-current account. In addition, uncollected revenue directly decreases the television programming provider's profits and reduces capital available for growth.

Accordingly, there exists a need for novel methods and systems for providing paid television programming to subscribers that reduce the amount of credit that television programming providers are required to extend to the subscribers.

DISCLOSURE OF THE INVENTION

According to one aspect, the present invention includes a prepaid entertainment card. The prepaid entertainment card has one or more codes on the card that allow a television programming provider to collect revenue for paid television programming in advance of providing the programming to a subscriber. According to another aspect, the present invention includes a system for allowing a subscriber to use a prepaid entertainment card to pay for television programming. The system includes a prepaid entertainment card status application and a prepaid entertainment status card database. The prepaid entertainment card status database contains a plurality of records indexed by card identification numbers. Each record includes a status field indicating whether the card is registered or unregistered and activated or not activated. The prepaid entertainment card status application accesses the prepaid entertainment card status database to determine the status of a card and to change the status of a card. For example, when a subscriber purchases a prepaid entertainment card, the status of the card is preferably changed from registered to unregistered in the database. Changing the card status from registered to unregistered reduces the likelihood of someone being able to use a card that was not legitimately purchased. When the subscriber activates the card, the status of the card in the database is changed from not activated to activated. When a card is activated, the value of the card can be applied to the subscriber's account with the television company. Once a card is activated, if the entire amount can be applied to the account, the card cannot be activated again.

Accordingly, it is an object of the present invention to provide prepaid entertainment cards and methods and systems for allowing subscribers to use prepaid entertainment cards to pay for television programming in advance.

It is another object of the invention to reduce the amount of credit that television programming providers are required to extend to subscribers in providing paid television programming to the subscribers.

It is yet another object of the invention to increase revenue for television programming providers.

Some of the objects of the invention having been stated hereinabove, other objects will be evident as the description proceeds, when taken in connection with the accompanying drawings as best described hereinbelow.

BRIEF DESCRIPTION OF THE DRAWINGS

Embodiments of the present invention will now be explained with reference to the accompanying drawings of which.

DETAILED DESCRIPTION OF THE INVENTION

Figure 1:
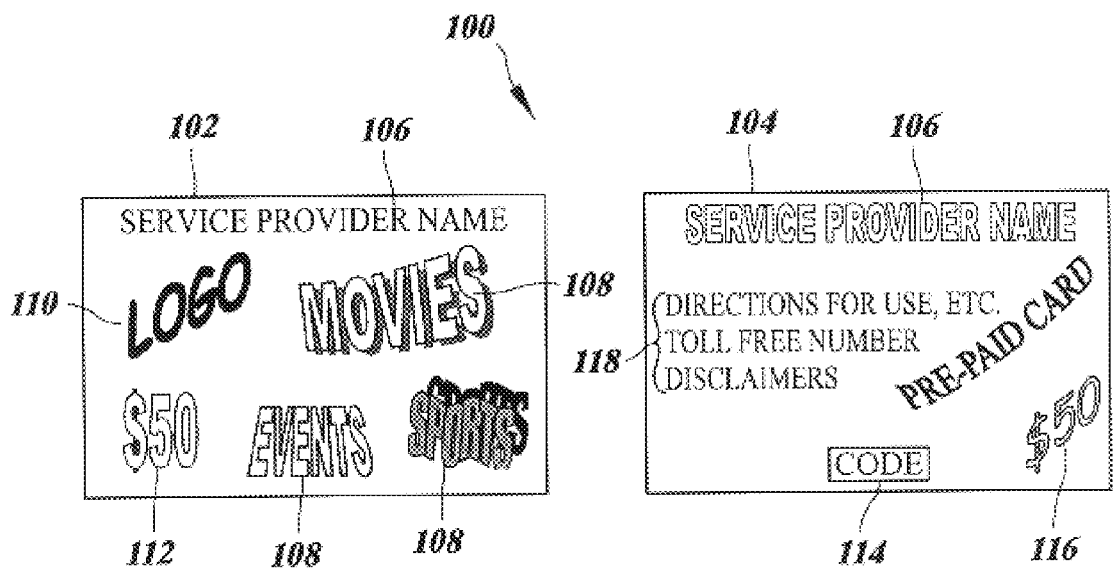
FIG. 1 is a block diagram illustrating a prepaid entertainment card according to an embodiment of the present invention.

FIG. 1 illustrates a prepaid entertainment card according to an embodiment of the present invention. In FIG. 1, prepaid entertainment card 100 includes a card body having a first side 102 and a second side 104. First side 102 includes information about the card, including service provider name 106, event information 108, logo information 110, and value information 112. Service provider name 106 may be the name of the television programming provider. For example, if the card is issued by a cable television company, service provider name 106 may be the name of the television programming provider, such as Time Warner Cable®. Event information 108 specifies the type of television programming events to which the card applies. In the illustrated embodiment event information 108 includes movies, sports and events. This event information indicates that card 100 applies to any of these types of programming. In an alternative embodiment, a card may be tailored for one or any combination of the events listed. For example, a prepaid movie card may be a card that is only usable to pay for television movies. Similarly, a prepaid sports card may only be usable to pay for television sporting events. A prepaid events card may be usable to pay for only special events programming. Using a prepaid entertainment card to pay for any type of paid television programming is intended to be within the scope of the invention.

Value information 112 contains the value of the prepaid entertainment card. In the illustrated embodiment, value information 112 is a dollar amount. This dollar amount may be used to pay for television programming specified by any one of the event types. Logo information 110 may be the logo of the service provider or of the card issuer.

Second side 104 of card 100 includes code 114 that encodes information usable by a prepaid entertainment card processing system to enable registration and activation of prepaid entertainment card 100. For example, code 114 may include a first code that identifies a type of television programming associated with the card. The type of television programming may be movies, events, sports or any other type of television programming for which a fee is charged for viewing. This code preferably corresponds to the event types listed on first side 102 of card 100. Code 114 preferably includes a second code that identifies the value of the card. For example, the second code may indicate the dollar amount for which the card was purchased. This amount preferably corresponds to value information 112 on first side 102 of card 100. Second side 104 may optionally include value information 116 that duplicates value information 112 on side 102 of card 100.

Code 114 may include a third code that uniquely identifies the card. The third code may be a card ID number such as 1234, used by a prepaid entertainment card processing system for registering and activating the card. Since the third code preferably uniquely identifies the card, in an alternative embodiment of the invention, the first and second codes may be eliminated. For example, the third or unique card code can be used to look up an entry for the card in a database. The entry in the database may indicate the type of the card and the value of the card, which obviates the need for a card type code or a card value code. However, in the present embodiment, it is assumed that the card includes a card type code and a value code.

Code 114 may be in any suitable format that is readable by a human, a machine, or both. For example, in one embodiment, code 114 comprises a bar code that encodes card identification information, value information, and card type information. In another embodiment, card code 114 may comprise a magnetic stripe that encodes the same information. In addition, to enable manual activation and registration of the card, code 114 may include human-readable characters printed on second side 104 of the card to enable a subscriber to manually activate the card, e.g. using registration and activation information in information field 118 on second side 104 of the card. For example, information field 118 may include directions for using the card, a toll free number for activating the card, and/or any disclaimers associated with the card. In yet another alternative embodiment, the card may be both manually and automatically activatable. Accordingly, in such an embodiment, code 114 may include both human-readable and machine-readable portions.

Figure 2:
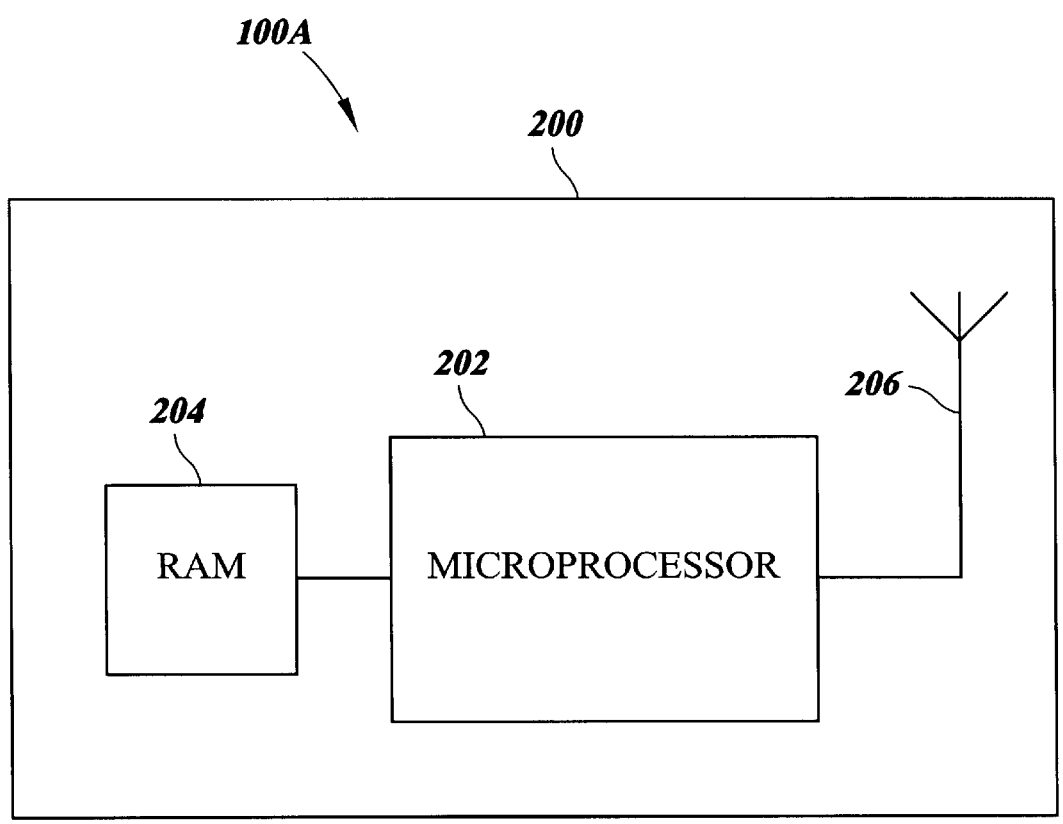
FIG. 2 is a block diagram of a prepaid entertainment card that comprises a smartcard according to an embodiment of the present invention.

FIG. 2 illustrates a prepaid entertainment card according to an alternative embodiment of the invention. In FIG. 2, prepaid entertainment card 100A comprises a smartcard. In the illustrated embodiment, prepaid entertainment card 100A includes a card body 200, and a microprocessor 202, a random access memory (RAM) 204 and an antenna 206 encapsulated within card body 200. RAM 204 stores instructions and data accessible by microprocessor 202. For example, RAM 204 may store instructions for instructing microprocessor 202 to provide card codes to a card reader when prepaid entertainment card 100A is brought in proximity to a card reader. Antenna 206 provides a path through which microprocessor 202 may communicate with a card reader and also provides power to microprocessor 202 based on signals received from a card reader. Further details regarding smartcard operation are not important to the invention. What is important is that prepaid entertainment card 100A stores one or more codes that allow the card to be registered, activated, and the value applied to television programming charges.

Figure 3:
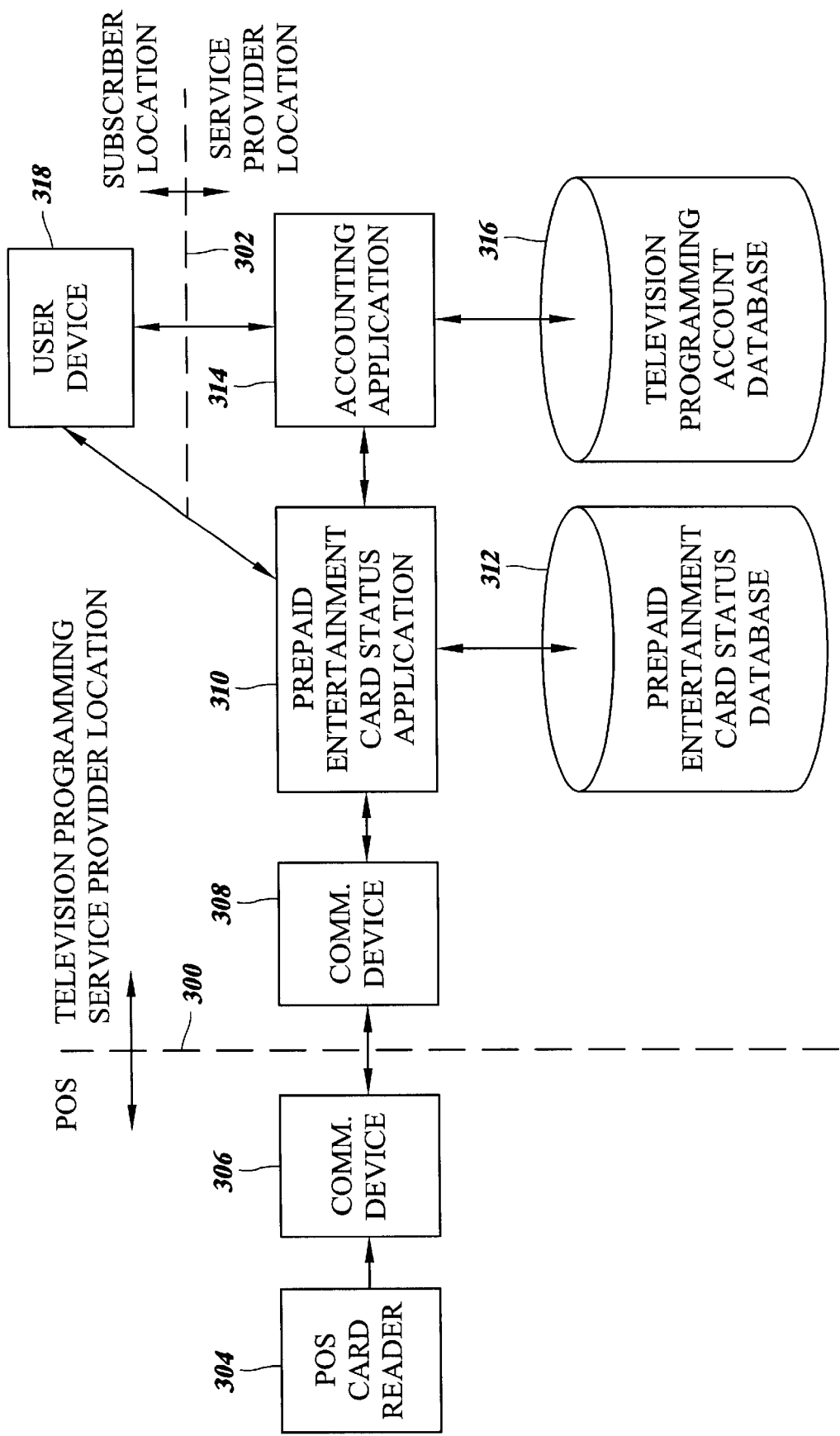
FIG. 3 is a block diagram illustrating a system using a prepaid entertainment card to pay for television programming according to an embodiment of the present invention.

FIG. 3 illustrates a system for registering, accessing, and using prepaid entertainment cards according to an embodiment of the present invention. In FIG. 3, it is assumed that prepaid entertainment cards are purchased at a point of sale, such as a retail store. The intelligence for processing a prepaid entertainment card may reside at the location of a television programming provider. Accordingly, dashed line 300 indicates a division between the point of sale and the television programming provider. Similarly, a user device for reading a card may be located at a subscriber location. Accordingly, dashed line 302 represents the division between a subscriber location and a television programming provider location.

In the system illustrated in FIG. 3, a point-of-sale card reader 304 reads code 114 from a prepaid entertainment card at the point of sale. POS card reader 304 may be any type of card reader. For example, if code 114 is a bar code, POS card reader 304 may be a conventional wand style bar code reader. Alternatively, if code 114 is encoded in a magnetic strip, POS card reader may be a magnetic card reader. If the prepaid entertainment card is a smartcard, POS card reader 304 may be smartcard reader. POS card reader 304 communicates code 114 to communication device 306. Communication device 306 may communicate with the corresponding communication device 308 located at the television programming provider. For example, communication devices 306 and 308 may each comprise modems that communicate over the public switched telephone network.

Communication device 308 at the television programming provider location may be coupled to one or more computers (not shown) such as personal computers. Residing on these computers is software that performs card registration and activation and databases that store card registration and activation data according to an embodiment of the present invention. In the illustrated embodiment, prepaid entertainment card status application 310 accesses prepaid entertainment card status database 312 to perform card activation and registration functions. Accounting application 314 communicates with prepaid entertainment card status application 310 to apply the value of a card to a subscriber's account. Television programming account database 316 stores records including account information for television programming subscribers. User device 318 communicates with prepaid entertainment card status application 310 and/or accounting application 314 to register and activate cards.

Figure 4:
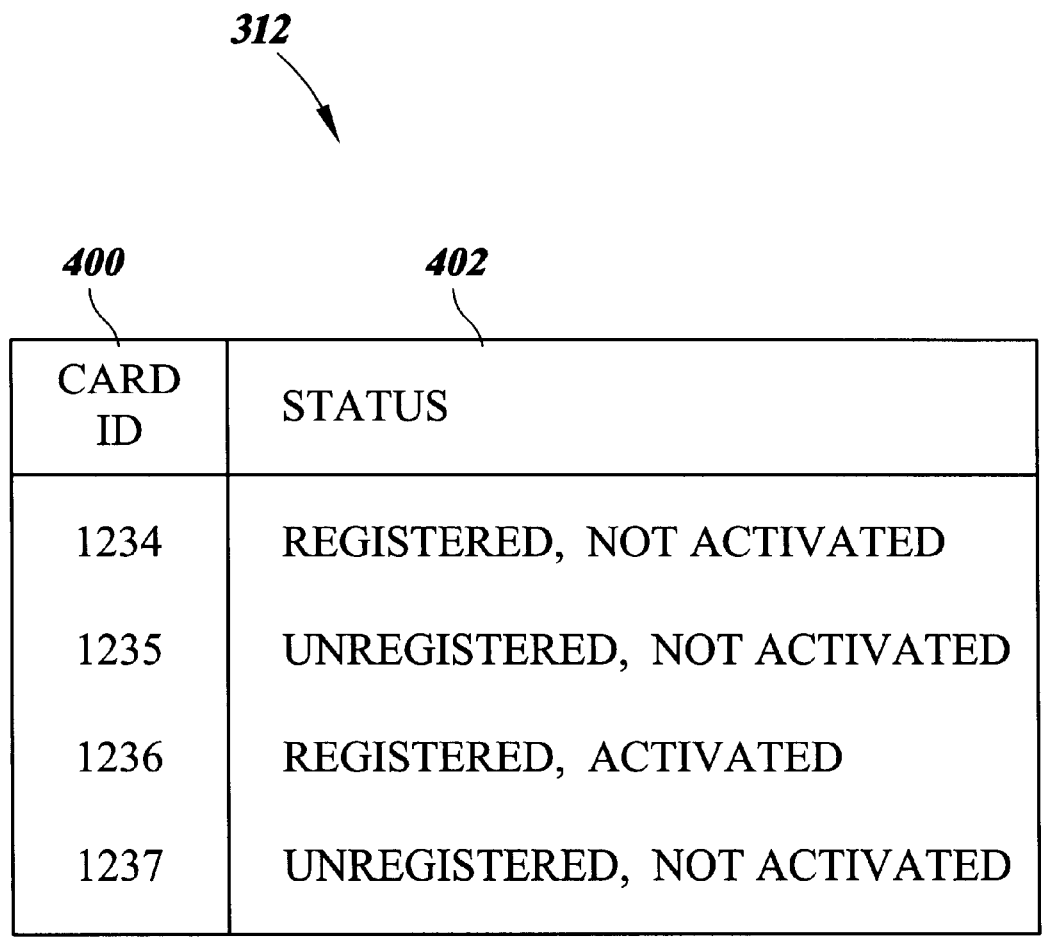
FIG. 4 is a block diagram of a prepaid entertainment card status database according to an embodiment of the present invention.

FIG. 4 illustrates exemplary fields or records that may be included in prepaid entertainment card status database 312. In the illustrated embodiment, each entry or record in prepaid entertainment card status database 312 includes a card ID field 400 and a card status field 402. Each card ID field encodes a unique card ID that corresponds to the unique card code encoded in code 114 on each card. Status field 402 includes a registration indicator and an activation indicator. The registration indicator indicates whether or not the card has been registered. As used herein, the term registered means that a card has been legitimately purchased or distributed by an authorized card seller or distributor. Activation indicator in status field 402 indicates whether the card has been activated. In the present example, a card is activated when a subscriber contacts the television programming provider and requests that the value of a card be applied to his or her account. In the present example, all of the value of a card is applied to the subscriber's account when the card is activated. In an alternative embodiment, a subscriber may be able to apply in predetermined increments of the value of a card to an account. In such an embodiment, database 312 may include an additional value field that indicates the value remaining of a card.

Figure 5:
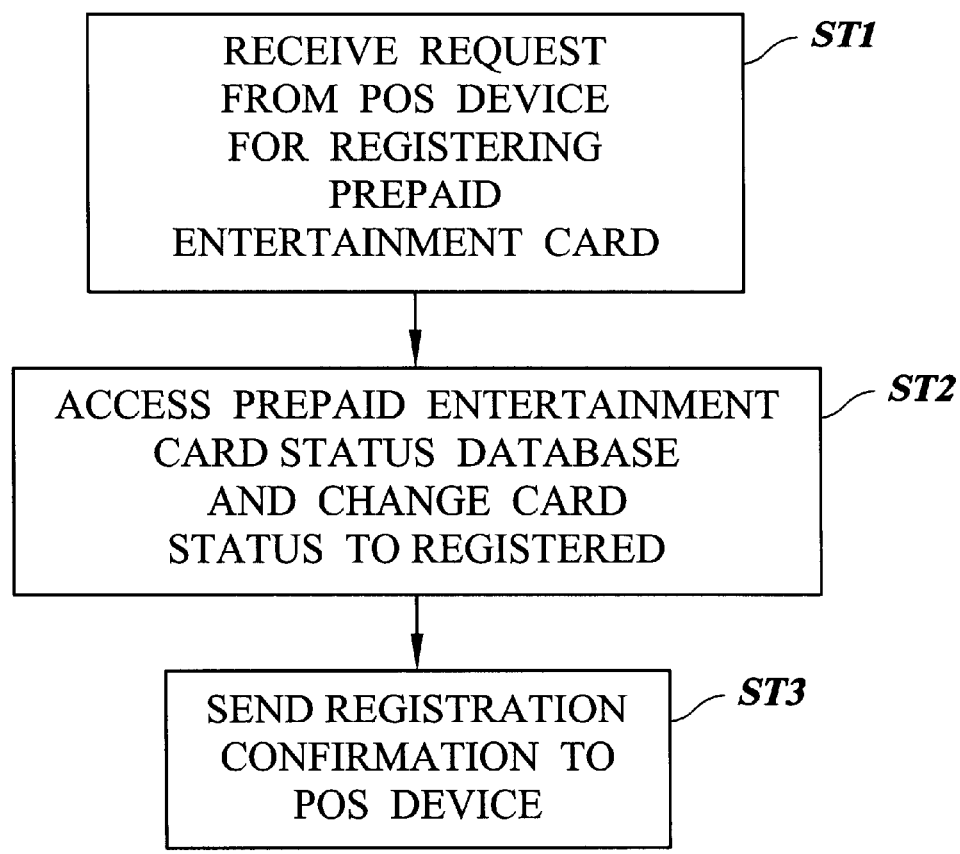
FIG. 5 is a flowchart illustrating exemplary steps that may be performed by a prepaid entertainment card status application in registering a prepaid entertainment card according to an embodiment of the present invention.

FIG. 5 is a flowchart illustrating exemplary steps that may be performed by prepaid entertainment card status application 310 in performing card registration. In step ST1, prepaid entertainment card status application 310 receives a registration request from a point-of-sale device. In step ST2, prepaid entertainment card status application 310 accesses prepaid entertainment card status database 312 and either creates or updates an entry to reflect that the card has been registered. For example, in one embodiment, prepaid card entertainment status database 312 may be provisioned with records for all prepaid entertainment cards both registered and unregistered. When prepaid entertainment card status application 310 accesses prepaid entertainment card status application database 312, prepaid entertainment card status application 310 may locate the existing entry based on the card ID and change the card status registration indicator from unregistered to registered. Alternatively, prepaid entertainment card status database 310 may not be provisioned with card IDs for unregistered cards. In such an embodiment, when prepaid entertainment card status application 310 receives a card registration request from point-of-sale device 304, prepaid entertainment card status application 310 may create an entry in prepaid entertainment card status database 312 for the card. The need for a registration indicator is obviated in this case since the presence of an entry for the card in the database indicates that the card has been registered. Once a card is registered in prepaid entertainment card status database 312, in step ST3, prepaid entertainment card status application 310 sends a registration confirmation message to point-of-sale device 304.

Figure 6:
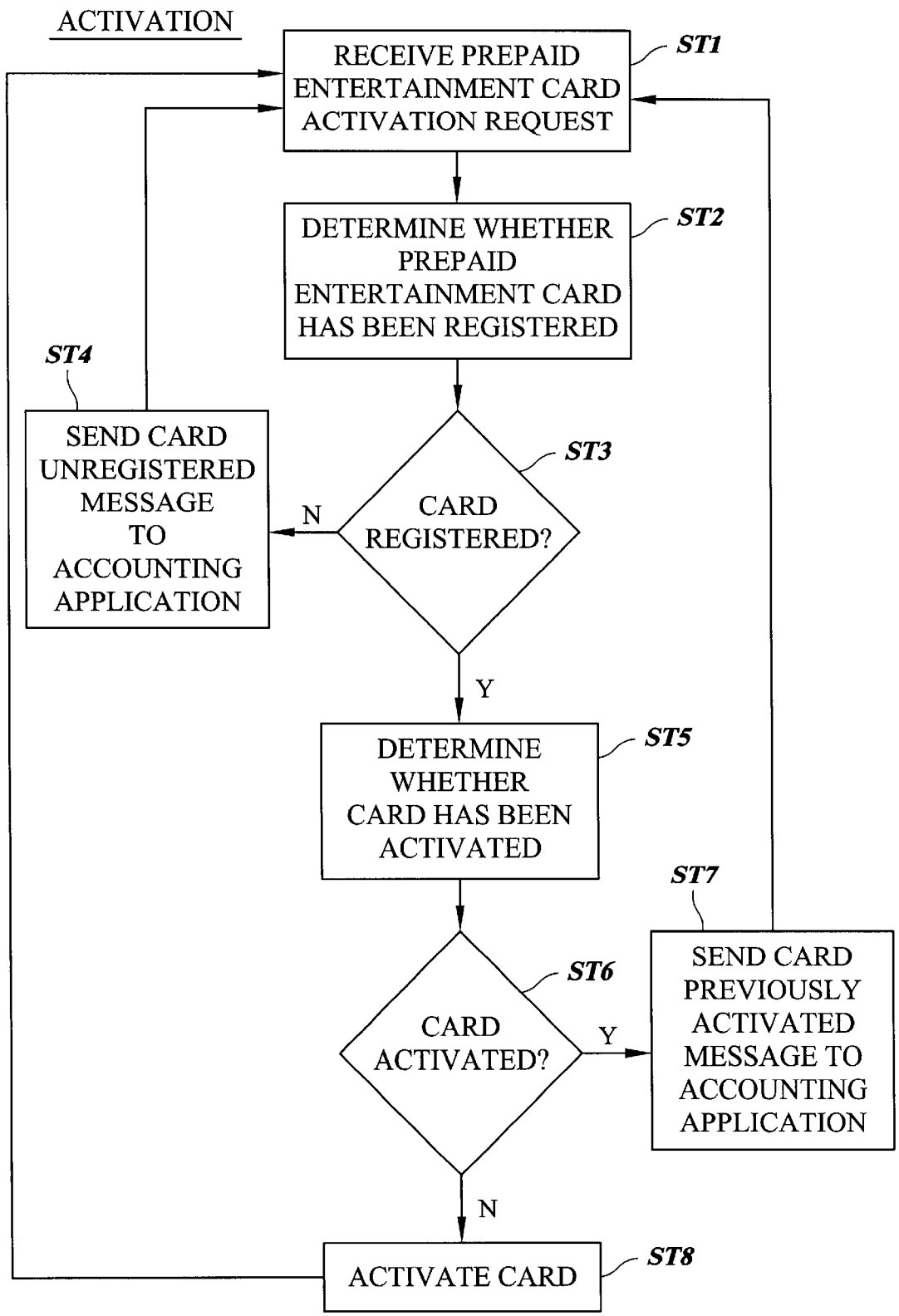
FIG. 6 is a flowchart illustrating exemplary steps that may be performed by a prepaid entertainment card status application in activating prepaid entertainment cards according to an embodiment of the present invention.

FIG. 6 is a flowchart illustrating exemplary steps that may be performed by prepaid entertainment card status application 310 in activating a card. In step ST1, prepaid entertainment card status application receives a prepaid entertainment card activation request. Such a request may originate from user device 318 or from accounting application 314 depending on the components of the prepaid entertainment card processing system. For example, user device 318 may be a card reader associated with a cable or satellite television system at the subscriber location that reads code 114 from a prepaid entertainment card and forwards the code over the public switched telephone network or over the coaxial cable used to provide television programming to the service provider location. The activation request may be received directly by prepaid entertainment card status application 310 or by accounting application 314.

In step ST2, once prepaid entertainment card status application 310 receives the card activation request, prepaid entertainment card status application 310 determines whether the prepaid entertainment card has been registered. Determining whether a prepaid entertainment card has been registered may include accessing prepaid entertainment card status database 312 and searching for the entry corresponding to the code received in the card activation request. In step ST3, if prepaid entertainment card status application 310 determines that the card has not been previously registered, prepaid entertainment card status application 310 may send a CARD UNREGISTERED message to accounting application 314. Accounting application 314 may display a message to an accounting supervisor that indicates that a user is attempting to use an unregistered card. Because the use of an unregistered card may indicate that the card has been stolen, the accounting supervisor may take appropriate action such as contacting the police and/or the location from which the card was purchased.

In step ST3, if prepaid entertainment card status application 310 determines that the card has been registered, in step ST4, prepaid entertainment card status application 310 determines whether the card has been activated. In this example, it is assumed that once a card is activated, all of the value from the card is applied to the subscriber's account. Accordingly, a previously activated card is not reusable. In an alternative embodiment, a card may be reusable by adding a value field to prepaid entertainment card status database 312, as discussed above. In step ST6, if prepaid entertainment card status application 310 determines that a card has been previously activated, in step ST7, prepaid entertainment card status application 312 sends a CARD PREVIOUSLY ACTIVATED message to accounting application 314. Accounting application 314 may communicate this information to the subscriber, e.g., by sending a message to user device 318, which may be displayed on the subscriber's television screen.

In step ST6, if prepaid entertainment card status application 310 determines that the card has not been previously activated, in step ST7, prepaid entertainment card status application 310 activates the card by adding an appropriate value entry to a database record for the subscriber in television programming account database 316. For example, the value of the card may be encoded in the card code read by point-of-sale card reader 304. Once prepaid entertainment card status application 310 receives a request for activating a card, prepaid entertainment card status application 310 may change the activation indicator in the prepaid entertainment status database 312 from not activated to activated and forward the value information to accounting application 314. Accounting application 314 may add the appropriate amount of value to a record for the subscriber in television programming account database 316. Accounting application 314 may identify the subscriber in any number of ways. For example, in a manual system, an accounting operator may ask the user to provide his or her account number via the telephone. In an automated system, the subscriber may key in his or her account number using keys or a dial on a telephone handset. In yet another alternative embodiment, the user's account may be determined automatically based on a subscriber's identification code received when user device 318 contacts accounting application 314.

Figure 7:
FIG. 7 is a block diagram illustrating an exemplary prepaid entertainment card accounting database record for a subscriber according to an embodiment of the present invention.

FIG. 7 illustrates an exemplary subscriber database record in television programming account database 316. In the illustrated example, account record 700 includes a DATE field that indicates the date on which an event occurred, a SERVICE field that indicates a type of service, a CODE field that indicates a service code, an AMOUNT field that indicates the amount of change in the account balance and a BALANCE field that indicates the television programming account balance. The illustrated account record indicates that the prepaid movies "Snake Eyes," "Apt Pupil," and "You've Got Mail" were ordered on Dec. 13, 1999, Dec. 15, 1999, and Dec. 17, 1999, respectively. Each of these orders resulted in an addition of $2.99 to the account balance. On Dec. 20, 1999, a prepaid card was applied to the account. The code for the prepaid card is 12345, which may correspond to the card ID. The value of the prepaid card was $100. Accordingly, the application of the prepaid card to the account resulted in the account balance changing from an outstanding balance of $56.90 a credit of $43.04. If a subscriber knows that there is a credit on his or her account, the subscriber is more likely to order paid programming. Accordingly, on Dec. 20, 1999, the account record indicates that the subscriber ordered the movie "Entrapment." Because the account balance reflected a credit, the television programming provider is not required to extend any credit to the subscriber before providing the movie. The fact that prepaid entertainment allows subscribers to pay for paid programming in advance reduces accounts receivable by television programming providers and increases the likelihood that a subscriber will order paid programming.

Figure 8:
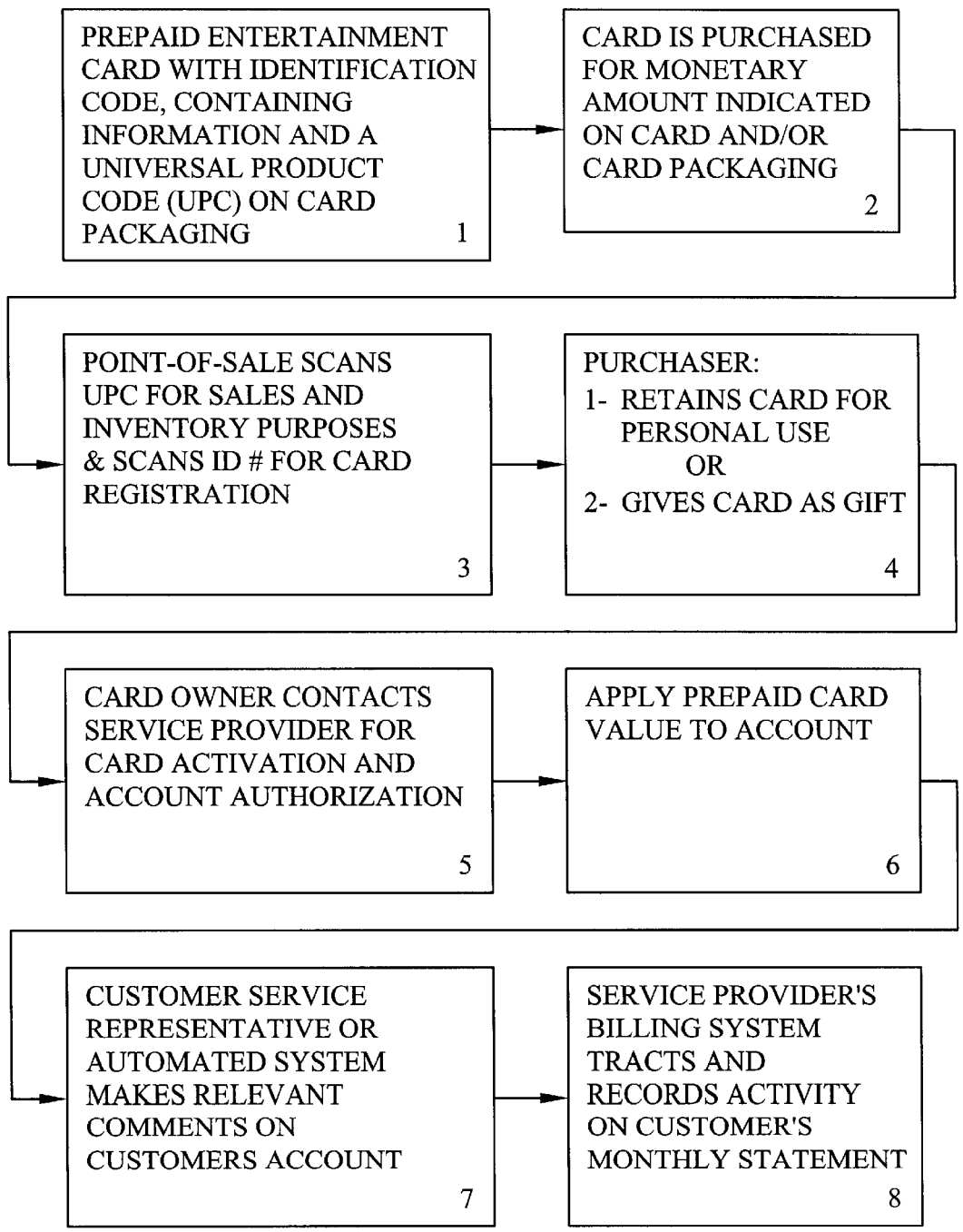
FIG. 8 is a flowchart illustrating exemplary steps for using a prepaid entertainment card to pay for television programming according to an embodiment of the present invention.

FIG. 8 illustrates exemplary steps that may be preformed in order to use prepaid entertainment card. In step 1, a prepaid entertainment card is created having a unique code. The card may contain value information, type information, and card ID information, as discussed above. There may also be a universal product code (UPC) associated with the card for inventory purposes at the point of sale. In step 2, the card is purchased for the monetary amount indicated on the card and/or the card packaging. In step 3 the point-of-sale device scans the UPC for sales and inventory purposes and scans the card code for card registration. In step 4, once the card is registered, the purchaser can either retain the card for use or give the card as a gift. In step 5, the card owner contacts the programming provider for card activation and account authorization. In this example, it is assumed that the card code is printed in human-readable format on the card. Accordingly, the owner contacts the programming provider and provides the card code to the programming provider either verbally or using the keys on the telephone handset. The owner may also provide account information that allows access to his or her television programming account. In step 6, the accounting system applies the prepaid card value to the account. In step 7, a customer service representative or an automated system may make relevant comments on the account indicating that a prepaid card was used. In step 8, the accounting system tracks and records all of the activity including the use of the prepaid card on the subscriber's account. Thus, as illustrated in FIG. 8, prepaid entertainment cards can easily be used to obtain payment for programming in advance.

BUSINESS METHODS

Prepaid entertainment cards according to the present invention provide a number of new revenue and promotional opportunities for television programming and equipment providers. For example, according to one business method, a television programming provider may offer prepaid entertainment cards with television programming access systems, such as satellite television systems to encourage consumers to purchase the systems. In an alternative business method, cards may be printed in advance of a known special event that a plurality of subscribers might desire to watch. The cards may be then placed in retail stores indicating that these cards are for use for that special event. For example, a heavyweight boxing match is usually announced several months in advance of the match. The cards may be printed for that match and placed in retail outlets in advance of the event to encourage subscribers to purchase the cards.

In yet another alternative business model, a plurality of prepaid entertainment cards may be placed in retail locations, such as department stores and convenience stores. The prepaid entertainment cards may be sold to consumers for value at the retail locations. The cards may also be registered at the retail locations in the manner described above. The television programming provider may collect revenue for the sales when the sales occur, when the prepaid entertainment cards are distributed to the retail locations, or at any other appropriate time. The card values will be applied to subscriber accounts when the cards are activated. Since activation occurs after revenue collection, television programming providers will have a positive revenue stream for the cards. In addition, the amount of time spent in collecting past due account balances is decreased, since the amount of money owed to the television programming provider will be decreased.

In yet another alternative business model, the prepaid cards may be physical or virtual cards distributed over the Internet. For example, subscribers may access a programming provider's website and purchase a real or virtual prepaid card using a credit card. The subscriber may also register and activate the card through the programming provider's website.

It will be understood that various details of the invention may be changed without departing from the scope of the invention. Furthermore, the foregoing description is for the purpose of illustration only, and not for the purpose of limitation—the invention being defined by the claims.

What is claimed is:

1. A prepaid entertainment card for allowing subscribers to pay for television programming in advance, the prepaid entertainment card comprising:
   (a) a card body;
   (b) a first code located in or on the card body for identifying a type of television programming associated with the card;
   (c) a second code located in or on the card body including an encoded dollar amount for allowing an existing pay television subscriber to selectively purchase additional television programming for which additional payment is required; and
   (d) a third code located in or on the card body for uniquely identifying the card.

2. The prepaid entertainment card of claim 1 wherein the first code is a television movie code for identifying the card as a prepaid television movie card.

3. The prepaid entertainment card of claim 1 wherein the first code is a prepaid television special events code for identifying the card as a prepaid television special events card.

4. The prepaid entertainment card of claim 1 wherein the first code is a general television programming code for identifying the card as a prepaid general television programming card.

5. The prepaid entertainment card of claim 1 wherein the first code is a code for identifying the card as at least one of: a general television programming card, a television movie card, and a television special events card.

6. The prepaid entertainment card of claim 1 wherein the second code is a dollar amount to be applied to prepaid television programming.

7. The prepaid entertainment card of claim 1 comprising a fourth code for identifying a place of purchase of the prepaid entertainment card.

8. The prepaid entertainment card of claim 1 comprising a fourth code for encoding an expiration date for the prepaid entertainment card.

9. The prepaid entertainment card of claim 1 wherein the first, second, and third codes comprise human-readable characters located on the card body.

10. The prepaid entertainment card of claim 1 comprising a machine-readable indicium located on the card body, wherein the first, second, and third codes are encoded in the machine-readable indicium.

11. The prepaid entertainment card of claim 1 comprising:
   (a) a machine-readable indicium located on the card body for encoding the first, second, and third codes; and
   (b) human-readable characters located on the card body for encoding the first, second, and third codes in human-readable format.

12. The prepaid entertainment card of claim 1 comprising a magnetic strip located on the card body, wherein the first, second, and third codes are encoded in the magnetic strip.

13. The prepaid entertainment card of claim 1 comprising a microprocessor and a memory device located inside the card body, wherein the first, second, and third codes are stored in the memory device, and the microprocessor is responsive to a signal from a card reader to output the first, second and third codes.

14. A system for using prepaid entertainment cards to pay for television programming provided to a subscriber, the system comprising:
   (a) a prepaid entertainment card status database for storing status information regarding at least one prepaid entertainment card storing an encoded dollar amount allowing an existing pay television subscriber to selectively purchase additional television programming for which additional payment is required, the status information including a card registration indicator for indicating whether the card has been registered and an activation indicator for indicating whether the card has been activated; and
   (b) a prepaid entertainment card status application for updating the registration indicator in the prepaid entertainment card database based on a registration message received from a point-of-sale device.

15. The system of claim 14 comprising:
   (c) a television programming account database for storing television programming account information for television programming subscribers; and
   (d) a television programming accounting application for receiving a request for activating a prepaid entertainment card from a pay television programming subscriber, transmitting a card activation request message to the prepaid entertainment card status application, receiving an activation response message from the prepaid card status application, and for updating account information for the subscriber in the television programming account database based on the activation response message.

16. The system of claim 15 wherein the prepaid entertainment card status application is adapted to access the prepaid entertainment card status database in response to receiving the card activation request message from the accounting application, search for an entry corresponding to the prepaid entertainment card, and read the registration and activation indicators associated with the entry.

17. The system of claim 15 wherein the prepaid entertainment card status application is adapted to change the card activation indicator from not activated to activated in response to the card activation request message.

18. The system of claim 15 wherein the prepaid entertainment card status application is adapted to send a card registration refusal message to the accounting application in response to determining that the card is either unregistered or previously activated.

19. The system of claim 15 wherein the television programming accounting application is adapted to receive a prepaid entertainment value code from the subscriber and apply a value encoded by the value code to the subscriber's account in response to receiving an activation approval message from the prepaid entertainment card status database.

20. A method for activating a prepaid entertainment card, the method comprising:
   (a) accessing a prepaid entertainment card status database to determine whether a prepaid entertainment card including an encoded dollar amount for allowing an existing pay television subscriber to selectively purchase additional television programming for which additional payment is required has been registered;

(b) in response to determining that the prepaid entertainment card has been registered, determining whether the prepaid entertainment card has been activated; and (c) in response to determining that the prepaid entertainment card has not been activated, activating the prepaid entertainment card.

21. The method of claim 20 wherein activating the prepaid entertainment card includes applying the encoded dollar amount to subscriber's television programming account.

22. The method of claim 21 wherein applying the amount to a subscriber's television programming account includes updating an entry for the subscriber in a subscriber account database.

23. The method of claim 21 wherein applying the encoded dollar amount to the subscriber's account includes applying the entire encoded dollar amount to the subscribers account.

24. The method of claim 21 wherein applying the encoded dollar amount to the subscribers account includes applying a portion of the encoded dollar amount to the subscriber's account.

25. The method of claim 21 comprising, in response to determining that the card has not been registered, alerting a customer service representative of the attempted activation of the unregistered card.

26. A method for doing business based on a prepaid entertainment card, the method comprising:

(a) distributing a plurality of prepaid entertainment cards including encoded dollar amounts for allowing existing pay television subscribers to selectively purchase additional television programming for which additional payment is required to a plurality of consumers;

(b) collecting revenue for distributing the prepaid entertainment cards based on the encoded dollar amount associated with each of the prepaid entertainment cards; and (c) applying the encoded dollar amounts of the entertainment cards to subscriber accounts in response to subscriber activation requests.

27. The method of claim 26 wherein distributing the prepaid entertainment cards to consumers includes selling the prepaid entertainment cards for value in retail locations.

28. The method of claim 26 wherein distributing the prepaid entertainment cards to consumers includes selling the prepaid entertainment cards to consumers via one or more websites.

29. The method of claim 26 wherein distributing the prepaid entertainment cards to consumers includes giving the prepaid entertainment cards to consumers in connection with entering contracts with television programming providers for new television programming service.

* * * * *